(12) United States Patent
Fieldman (10) Patent No.: US 12,353,784 B1
(45) Date of Patent: Jul. 8, 2025

(54) MODIFIED VIEWS FOR AN EXTENDED REALITY ENVIRONMENT

(71) Applicant: Curio XR (VR EDU), Gainesville, FL (US)

(72) Inventor: Ethan Fieldman, Gainesville, FL (US)

(73) Assignee: Curio XR (VR EDU), Gainesville, FL (US)

( * ) Notice: Subject to any disclaimer, the term of this patent is extended or adjusted under 35 U.S.C. 154(b) by 0 days.

(21) Appl. No.: 18/594,326

(22) Filed: Mar. 4, 2024

(51) Int. Cl.
  *G06F 3/14* (2006.01)
  *G06T 15/20* (2011.01)
  *G06T 19/00* (2011.01)

(52) U.S. Cl.
  CPC .......... *G06F 3/1454* (2013.01); *G06T 15/20* (2013.01); *G06T 19/00* (2013.01); *G06T 2200/24* (2013.01)

(58) Field of Classification Search
  CPC ....... G06F 3/1454; G06T 15/20; G06T 19/00; G06T 2200/24
  See application file for complete search history.

(56) References Cited

U.S. PATENT DOCUMENTS

| 11,948,263 | B1 * | 4/2024 | Rudman | G06V 20/20 |
| 2013/0281208 | A1 * | 10/2013 | Lyons | A63F 13/213 463/33 |
| 2019/0043214 | A1 * | 2/2019 | Chilcote-Bacco | G06T 7/70 |
| 2020/0241647 | A1 * | 7/2020 | Kanda | G06F 3/0481 |
| 2021/0043005 | A1 * | 2/2021 | Arora | H04W 4/025 |
| 2021/0065432 | A1 * | 3/2021 | Bickerstaff | G06T 7/75 |
| 2021/0295602 | A1 * | 9/2021 | Scapel | G06F 3/04815 |
| 2022/0035508 | A1 * | 2/2022 | Holland | G06F 3/0426 |
| 2022/0255973 | A1 * | 8/2022 | Berliner | G06T 7/70 |
| 2022/0277529 | A1 * | 9/2022 | Molyneaux | H04N 13/204 |
| 2023/0162448 | A1 * | 5/2023 | Alamdar | A63F 13/5372 463/31 |
| 2023/0300559 | A1 * | 9/2023 | Berliner | G06V 10/25 455/456.3 |
| 2023/0326145 | A1 * | 10/2023 | Plotkin | G06F 3/011 711/206 |
| 2023/0336865 | A1 * | 10/2023 | Da Veiga | G06F 3/0488 |
| 2024/0095329 | A1 * | 3/2024 | Fang | G06F 21/31 |

OTHER PUBLICATIONS

Lee et al—Integration of Extended Reality and a High-Fidelity Simulator in Team-Based Simulations for Emergency Scenarios—Sep. 6, 2021—MDPI (Year: 2021).*

\* cited by examiner

*Primary Examiner* — YuJang Tswei
(74) *Attorney, Agent, or Firm* — Finnegan, Henderson, Farabow, Garrett & Dunner LLP (57) ABSTRACT

Disclosed herein are methods, systems, and computer-readable media for casting an extended reality environment from an extended reality device for external observers. In an embodiment, a system may include at least one processor configured to receive an input, from at least one camera, representing a physical environment of a user; generate an internal view based on the input, the internal view including at least one virtual reality object; generate an external view by replacing at least a portion of the internal view of the physical environment of the user with alternate content; and cast the external view to an external device for viewing by the external observers.

27 Claims, 7 Drawing Sheets

MODIFIED VIEWS FOR AN EXTENDED REALITY ENVIRONMENT

FIELD OF DISCLOSURE

The disclosed embodiments generally relate to systems, devices, methods, and computer-readable media for casting an extended reality environment from an extended reality device to external observers.

BACKGROUND

Extended reality environments may provide realistic and immersive settings for sharing information. The improved processor speeds, data storage, and data transfer of extended reality extended reality devices, such as extended reality headsets, smart glasses, and other wearable extended reality devices, may allow for hands-on collaboration and presentation of information, such as virtual information, among many users. For example, extended reality environments may enhance student learning by allowing for interactive education. In other examples, extended reality environments may allow people to share and explain concepts in an immersive way in professional settings.

However, a challenge with implementing extended reality technology in educational and professional settings is that all users participating in the extended reality environment must typically have an extended reality device. Providing a large group of people with an extended reality device may be difficult to achieve in educational or professional settings with limited budgets. A solution to this problem may be to allow a single user, such as a teacher in a classroom or a presenter in a professional setting, to control and interact with the extended reality environment while casting the extended reality environment for external observers to view on a screen in the physical environment. However, it may be difficult, and potentially dangerous, for a teacher to use an extended reality device in a classroom without being able to see the students or objects of interest in the classroom. Further, it may be difficult for a presenter in a professional setting to present using an extended reality device without seeing the other people (or objects of interest) in the room. To address this problem, the teacher or the presenter may use an extended reality environment that allows the teacher or the presenter to see the physical environment in addition to the virtual reality environment. However, if teachers or presenters are casting the extended reality environment to external observers, they may not want to cast the physical environment to be viewed by an audience already present in the physical environment. Casting the physical environment in addition to the virtual reality environment observable through the extended reality device may distract external observers and detract from presentation material, such as virtual reality objects.

Therefore, to address these technical deficiencies in casting extended reality environments, solutions should be provided to cast an extended reality environment from an extended reality device to external observers while minimizing casting the physical environment. Such solutions should ensure that the user wearing the extended reality device can see the other people in the physical environment in addition to the virtual reality objects. For example, such solutions should allow the extended reality device of the user to receive an internal view including a view of the physical environment of the user and at least one virtual reality object. Further, such solutions should generate and cast to external observers an external view by replacing at least a portion of the internal view of the physical environment with alternate content. These solutions may allow a user of an extended reality device to view the physical environment without casting the physical environment to external users.

SUMMARY

The disclosed embodiments describe a method for casting an extended reality environment from an extended reality device for external observers. For example, in an embodiment, the method may comprise receiving an input, from at least one camera, representing a physical environment of a user, generating an internal view based on the input, the internal view including at least one virtual reality object, generating an external view by replacing at least a portion of the internal view of the physical environment of the user with alternate content, and casting the external view to an external device for viewing by the external observers.

According to a disclosed embodiment, the at least one virtual reality object may comprise at least one of a three-dimensional object, a video recording, a whiteboard, or a text display.

According to a disclosed embodiment, the operations may further comprise receiving a selection between a first mode of operation and a second mode of operation.

According to a disclosed embodiment, the first mode of operation may comprise replacing at least a portion of the view of the physical environment of the user with a solid background and the second mode of operation may comprise replacing the view of the physical environment of the user with an image, a video, or a computer-generated rendering.

According to a disclosed embodiment, the operations may further comprise detecting a user interaction selecting at least one private virtual reality object in the internal view, and hiding the at least one private virtual reality object from the external view.

According to a disclosed embodiment, the operations may further comprise detecting a user interaction selecting at least one virtual reality object for removal from the external view from the external view, and removing the at least one virtual reality object from the external view.

According to a disclosed embodiment, the internal view of the physical environment of the user may comprise a locked view of the external viewers.

According to a disclosed embodiment, the locked view may comprise a user-configurable boundary around the external viewers.

According to a disclosed embodiment, the operations may further comprise calibrating the locked view of the external viewers.

According to a disclosed embodiment, the operations may further comprise setting the locked view of the external viewers using face tracking.

The disclosed embodiments may also describe a system for casting an extended reality environment from an extended reality device for external observers. For example, in an embodiment, the system may comprise at least one memory storing instructions and at least one processor configured to execute the instructions to perform operations for casting an extended reality environment from an extended reality device for external observers. In an embodiment, the operations may comprise receiving an input, from at least one camera, representing a physical environment of a user, generating an internal view based on the input, the internal view including at least one virtual reality object, generating an external view by replacing at least a portion of the internal view of the physical environment of the user with alternate content, and casting the external view to an external device for viewing by the external observers.

According to a disclosed embodiment, the internal view may comprise the at least one virtual reality object in a first display area and the input of the physical environment of the user in a second display area.

According to a disclosed embodiment, the internal view may further comprise a preview window of the external view.

According to a disclosed embodiment, the at least one camera may comprise at least one camera of the extended reality device of the user or at least one camera within the physical environment.

According to a disclosed embodiment, the operations may further comprise displaying the internal view to a display of the extended reality device while casting the external view to the external device.

According to a disclosed embodiment, the alternate content may comprise a solid background behind the at least one virtual reality object.

According to a disclosed embodiment, the alternate content may comprise an image, a video, or a computer-generated rendering behind the at least one virtual reality object.

The disclosed embodiments may also describe a non-transitory computer readable medium including instructions that may be executable by one or more processors to perform operations that may comprise receiving an input, from at least one camera, representing a physical environment of a user, generating an internal view based on the input, the internal view including at least one virtual reality object, generating an external view by replacing at least a portion of the internal view of the physical environment of the user with alternate content, and casting the external view to an external device for viewing by the external observers.

According to a disclosed embodiment, the operations may further comprise at least one of creating, modifying, or removing additional virtual reality objects within the internal view.

According to a disclosed embodiment, the operations may further comprise transmitting the additional virtual reality objects through the external view.

Other systems, methods, and computer-readable media are also discussed herein. Disclosed embodiments may include any of the above aspects alone or in combination with one or more aspects, whether implemented as a method, by at least one processor, and/or stored as executable instructions on non-transitory computer readable media.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed (e.g., executed) simultaneously, at the same point in time, or concurrently. Reference will now be made in detail to the disclosed embodiments, examples of which are illustrated in the accompanying drawings.

It is to be understood that both the foregoing general description and the following detailed description are exemplary and explanatory only and are not restrictive of this disclosure. The accompanying drawings, which are incorporated in and constitute a part of this specification, illustrate several exemplary embodiments and together with the description, serve to outline principles of the exemplary embodiments.

This disclosure may be described in the general context of customized hardware capable of executing customized preloaded instructions such as, e.g., computer-executable instructions for performing program modules. Program modules may include one or more of routines, programs, objects, variables, commands, scripts, functions, applications, components, data structures, and so forth, which may perform particular tasks or implement particular abstract data types. The disclosed embodiments may also be practiced in distributed computing environments where tasks are performed by remote processing devices that are linked through a communications network. In a distributed computing environment, program modules may be located in local and/or remote computer storage media including memory storage devices.

The techniques for casting an extended reality environment from an extended reality device for external observers described herein overcome technological problems relating to providing extended reality environments in a safe, efficient, and effective manner. In particular, the disclosed embodiments provide techniques for casting an extended reality environment from an extended reality device without casting a view of the physical environment of the user to the external observers. As discussed above, a user of an extended reality device may not be able to use an extended reality device safely and effectively without being able to see the other people within the physical environment. Existing techniques for casting, however, fail to allow the user of an extended reality device to view the physical environment through the extended reality device while casting the virtual reality environment to the external observers.

The disclosed embodiments provide technical solutions to these and other problems arising from current techniques. For example, various disclosed embodiments provide a method for casting an extended reality environment from the extended reality device of the user by receiving an input from a camera of a user comprising an internal view of a physical environment of the user and at least one virtual reality object, generating an external view by replacing at least a portion of the internal view of the physical environment of the user with alternate content, and casting the external view to an external device for viewing by the external observers. The disclosed embodiments provide a method that allows a user of an extended reality device to observe, control, and interact with an internal view of an extended reality environment while casting a different external view of the extended reality environment to external observers.

Reference will now be made in detail to the disclosed embodiments, examples of which are illustrated in the accompanying drawings. It should be noted that while some embodiments may refer to students or teachers, all of the disclosed embodiments may be used in other contexts as well, such as with any presenter and any audience or with a single user alone.

Figure 1A:
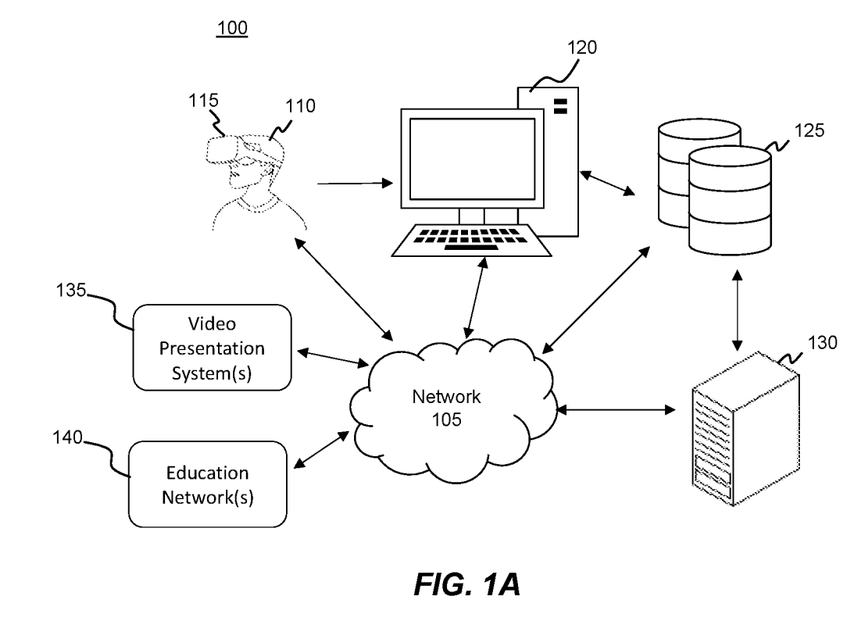
FIG. 1A is a block diagram of a system for casting an extended reality environment from an extended reality device for external observers, consistent with embodiments of the present disclosure.

FIG. 1A illustrates a system 100 for casting an extended reality environment from an extended reality device for external observers, consistent with the disclosed embodiments. System 100 may include one or more users 110 operating one or more extended reality devices 115, one or more computing devices 120, one or more databases 125, one or more servers 130, one or more video presentation systems 135, and one or more education networks 140, as shown in FIG. 1.

System 100 may include an extended reality system for displaying an extended reality environment. The term "extended reality environment," which may also be referred to as "extended reality," "extended reality space," or "extended environment," refers to all types of real-and-virtual combined environments and human-machine interactions at least partially generated by computer technology. The extended reality environment may be a completely simulated virtual environment or a combined real-and-virtual environment that user 110 may perceive from different perspectives. In some examples, user 110 may interact with elements of the extended reality environment. One non-limiting example of an extended reality environment may be a virtual reality environment, also known as "virtual reality" or a "virtual environment." An immersive virtual reality environment may be a simulated nonphysical environment which provides to the user 110 the perception of being present in the virtual environment. Another non-limiting example of an extended reality environment may involve a live direct or indirect view of a physical real-world environment that is enhanced with virtual computer-generated perceptual information, such as virtual objects that the user may interact with. Another non-limiting example of an extended reality environment is a mixed reality environment, also known as "mixed reality" or a "mixed environment." A mixed reality environment may be a hybrid of physical real-world and virtual environments, in which physical and virtual objects may coexist and interact in real time. In some examples, both extended reality environments and mixed reality environments may include a combination of real and virtual worlds, real-time interactions, and accurate 3D registration of virtual and real objects. In some examples, both extended reality environments and mixed reality environments may include constructive overlaid sensory information that may be added to the physical environment. In other examples, both extended reality environment and mixed reality environments may include destructive virtual content that may mask at least part of the physical environment.

System 100 may include an extended reality device 115 which may be operated or worn by a user 110. Extended reality device 115 may include any type of device or system that enables a user, such as user 110, to perceive and/or interact with an extended reality environment. Extended reality device 115 may enable user 110 to perceive and/or interact with an extended reality environment through one or more sensory modalities. Some non-limiting examples of such sensory modalities may include visual, auditory, haptic, somatosensory, and olfactory. Consistent with one aspect of the disclosure, the extended reality device 115 may be a wearable device, such as a head-mounted device, for example, smart glasses, smart contact lens, extended reality devices (e.g., the Meta Quest Pro, Apple Vision Pro, HTC VIVE, Oculus, Valve Index) or any other device worn by user 110 for purposes of presenting an extended reality to the user 110. Other extended reality devices 115 may include a holographic projector or any other device or system capable of providing an extended reality, virtual reality, mixed reality, or any immersive experience. Typical components of wearable extended reality devices 115 may include at least one of: a stereoscopic head-mounted display, a stereoscopic head-mounted sound system, head-motion tracking sensors (such as gyroscopes, accelerometers, magnetometers, image sensors, structured light sensors, etc.), head mounted projectors, eye-tracking sensors, and additional components described below. Consistent with another aspect of the disclosure, the extended reality device 115 may be a non-wearable extended reality device, which may include multi-projected environment devices. In some embodiments, an extended reality device 115 may be configured to change the viewing perspective of the extended reality environment in response to movements of the user 110 and in response to head movements of the user 110 in particular. In one example, a wearable extended reality device 115 may change the field-of-view of the extended reality environment in response to a change of the head pose of the user 110, such as by changing the spatial orientation without changing the spatial position of the user 110 in the extended reality environment.

The various components of system 100 may communicate over a network 105, which may include at least one of the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or any electronic communication architecture. In some embodiments, the communications may take place across two or more of these forms of networks and their corresponding protocols. While system 100 is shown as a network-based environment, it is understood that the disclosed systems and methods may also be used in a localized system, with one or more of the components communicating directly with each other.

Computing devices 120 may be a variety of different types of computing devices capable of developing, storing, analyzing, and/or executing software code. For example, computing device 120 may be a personal computer (e.g., a desktop or laptop), an IoT device (e.g., sensor, smart home appliance, connected vehicle, etc.), a server, a mainframe, a vehicle-based or aircraft-based computer, a virtual machine (e.g., virtualized computer, container instance, etc.), or the like. Computing device 120 may be a handheld device (e.g., a mobile phone, a tablet, or a notebook), a wearable device (e.g., a smart watch, smart jewelry, an implantable device, a fitness tracker, smart clothing, a head-mounted display, etc.), an IoT device (e.g., smart home devices, industrial devices, etc.), or various other devices capable of processing and/or receiving data. Computing device 120 may operate using a Windows™ operating system, a terminal-based (e.g., Unix or Linux) operating system, a cloud-based operating system (e.g., through AWS™, Azure™, IBM Cloud™, etc.), or other types of non-terminal operating systems.

System 100 may further comprise one or more database(s) 125, which may store and/or execute software. For example, database 125 may be configured to store software or code, such as code developed using computing device 120. Database 125 may further be accessed by computing device 120, server 130, or other components of system 100 for downloading, receiving, processing, editing, or running the stored software or code. Database 125 may be any suitable combination of data storage devices, which may optionally include any type or combination of databases, load balancers, dummy servers, firewalls, back-up databases, and/or any other desired database components. In some embodiments, database 125 may be employed as a cloud service, such as a Software as a Service (SaaS) system, a Platform as a Service (PaaS), or Infrastructure as a Service (IaaS) system. For example, database 125 may be based on infrastructure or services of Amazon Web Services™ (AWS™), Microsoft Azure™, Google Cloud Platform™, Cisco Metapod™, Joyent™, vmWare™, or other cloud computing providers. Database 125 may be configured to use a data sharing platform, which may include other commercial file sharing services, such as Dropbox™, Google Docs™, or iCloud™. In some embodiments, database 125 may be a remote storage location, such as a network drive or server in communication with network 105. In other embodiments database 125 may also be a local storage device, such as local memory of one or more computing devices (e.g., computing device 120) in a distributed computing environment.

System 100 may also comprise one or more server device(s) 130 in communication with network 105. Server 130 may manage the various components in system 100. In some embodiments, server 130 may be configured to process and manage requests between computing devices 120 and/or databases 125. Server 130 may identify updates to code in database 125, may receive updates when new or revised code is entered in database 125, and may participate in casting an extended reality environment from an extended reality device of a user for external observers.

System 100 may also comprise one or more video presentation systems 135. Video presentation system 135 may comprise components capable of displaying the external view from the extended reality device 115 of user 110 to external observers. For example, video presentation system 135 may comprise a physical background for displaying the external view to external viewers. Video presentation system 135 may further comprise a projection device such as a projector or a screen such as a computer or television screen.

System 100 may also comprise one or more education networks 140. Education networks 140 may provide a variety of tools and resources that may be incorporated by user 110 into the extended reality environment displayed by extended reality device 115. For example, education network 140, which may include one or more storage devices (not explicitly depicted), may provide backgrounds of an extended reality environment, an appearance of avatars in an extended reality object, a room in which instruction may take place, or any virtual reality objects that may be used or created in an extended reality environment. User 110 may access education network 140 while using extended reality device 115 through network 105 to develop and display an educational virtual or extended reality environment for instructing students.

Figure 1B:
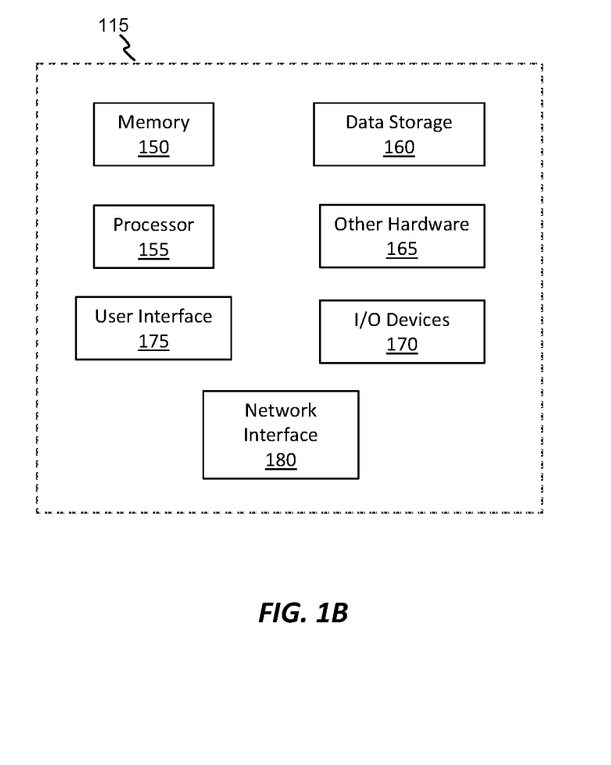
FIG. 1B is a block diagram illustrating an exemplary operating environment for implementing various aspects of this disclosure, consistent with embodiments of the present disclosure.
Figure 2:
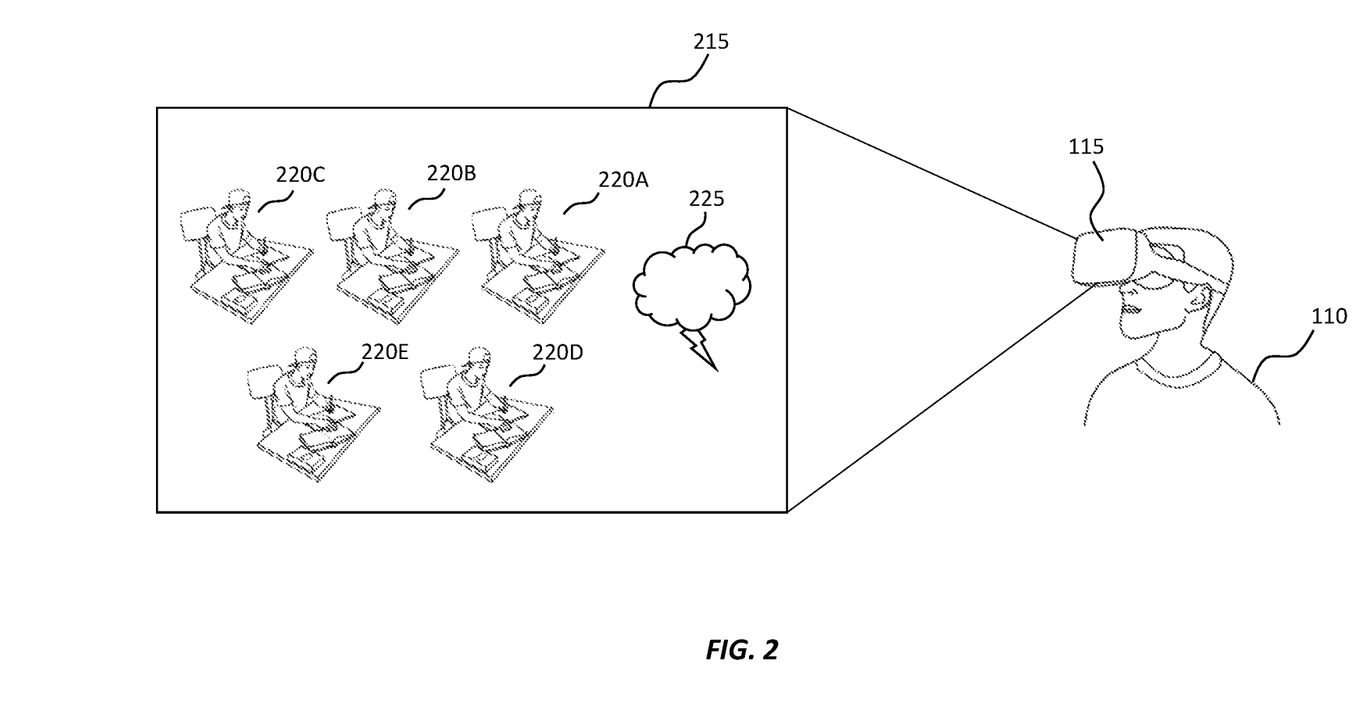
FIG. 2 is an illustration of an extended reality implementation, consistent with embodiments of the present disclosure.

FIG. 1B is a block diagram of an operating environment of extended reality device 115 for implementing various aspects of the present disclosure. As illustrated in FIG. 2, components of extended reality device 115 may include, but are not limited to, various hardware components, such as a system memory 150, one or more processors 155, data storage 160, other hardware 165, one or more I/O devices 170, a user interface 175, a network interface 180, and a system bus (not shown) that couples (e.g., communicably couples, physically couples, and/or electrically couples) various system components such that the components may transmit data to and from one another. The system bus may be any of several types of bus structures including a memory bus or memory controller, a peripheral bus, and a local bus using any of a variety of bus architectures. By way of example, and not limitation, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Extended reality device 115 may include at least one logical processor 155. The at least one logical processor 155 may include circuitry and transistors configured to execute instructions from memory (e.g., memory 150). For example, the at least one logical processor 155 may include one or more central processing units (CPUs), arithmetic logic units (ALUs), Floating Point Units (FPUs), and/or Graphics Processing Units (GPUs). The extended reality device 115, like other suitable devices, may also include one or more computer-readable storage media, which may include, but are not limited to, memory 150 and data storage 160. In some embodiments, memory 150 and data storage 160 may be part a single memory component. The one or more computer-readable storage media may also be of different physical types. The media may be volatile memory, non-volatile memory, fixed in place media, removable media, magnetic media, optical media, solid-state media, and/or of other types of physical durable storage media (as opposed to merely a propagated signal). Some other examples of computer-readable storage media may include built-in random access memory (RAM), read-only memory (ROM), hard disks, and other memory storage devices which are not readily removable by users (e.g., memory 150).

The data storage 160 or system memory 150 may include computer storage media in the form of volatile and/or nonvolatile memory such as ROM and RAM. A basic input/output system (BIOS), containing the basic routines that help to transfer information between elements within extended reality device 115, such as during start-up, may be stored in ROM. RAM may contain data and/or program modules that are immediately accessible to and/or presently being operated on by processing unit. By way of example, and not limitation, data storage 160 may hold an operating system, application programs, and other program modules and program data.

Data storage 160 may also include other removable/non-removable, volatile/nonvolatile computer storage media. By way of example only, data storage 160 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

Although an embodiment may be described as being implemented as software instructions executed by one or more processors in a computing device (e.g., general-purpose computer, server, or cluster) or an extended reality device, such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include other hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processor(s) 155, memory 150, data storage 160, and screens/displays, an operating environment may also include other hardware 165, such as batteries, buses, power supplies, wired and wireless network interface cards, for instance. In some embodiment, input/output devices 170 such as human user input/output devices (screen, keyboard, mouse, tablet, microphone, speaker, motion sensor, etc.) may be present in operable communication with one or more processors 155 and memory 150. A user such as user 110 may interact with the extended reality environment through extended reality device 115 by using one or more I/O device 170, such as a display, keyboard, mouse, microphone, touchpad, camera, sensor (e.g., touch sensor) and other devices, via typed text, touch, voice, movement, computer vision, gestures, and/or other forms of input/output.

Extended reality device 115 may further be configured to present at least one user interface 175. A user interface 175 may support interaction between an embodiment and user 110. A user interface 175 may include one or more of a command line interface, a graphical user interface (GUI), natural user interface (NUI), voice command interface, and/or other user interface (UI) presentations, which may be presented as distinct options or may be integrated. A user may enter commands and information through a user interface 175 or other I/O devices 170 such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other NUI may also be used with the appropriate input devices, such as a microphone, camera, tablet, touch pad, glove, or other sensor. These and other input devices are often connected to the processing units through a user input interface that is coupled to the system bus, but may be connected by other interface and bus structures, such as a parallel port, game port or a universal serial bus (USB). User interface 175 may include one or more toggles or controls which a user can interact with or operate. In some embodiments, the extended reality environment displayed by extended reality device 115 may change based on (e.g., in response to, derived from, dependent upon) interactions with the user interface 175. For example, the extended reality environment may change based on an interaction with a button, control, icon, or toggle displayed in the user interface 175. An interaction with user interface 175 may include gestures such as hovers, clicks, long presses, or the like, and interactions may be executed by a user in some examples.

Other computerized devices and/or systems not shown in FIG. 1B may interact in technological ways with extended reality device 115 or with another system using one or more connections to a network, such as network 105, via a network interface 180, which may include network interface equipment, such as a physical network interface controller (NIC) or a virtual network interface (VIF).

FIG. 2 depicts an embodiment of an extended reality implementation. User 110 may wear or otherwise operate an extended reality device, such as extended reality device 115. Extended reality device 115 may display extended reality environment 215. Extended reality environment 215 may comprise a live direct view of the physical environment of user 110 that is enhanced with virtual, computer-generated perceptual information. Computer generated perceptual information may include one or more virtual reality objects, such as a virtual reality object 225, that user 110 may interact with. For example, as depicted in FIG. 2, user 110 may view the physical environment, including students 220A, 220B, 220C, 220D, and 220E (220A-220E), and may also view at least one virtual reality object 225 integrated with the physical environment. This view of extended reality environment 215 may allow user 110 to view the students 220A-220E within the physical environment while also viewing and interacting with at least one virtual reality object 225.

Figure 3:
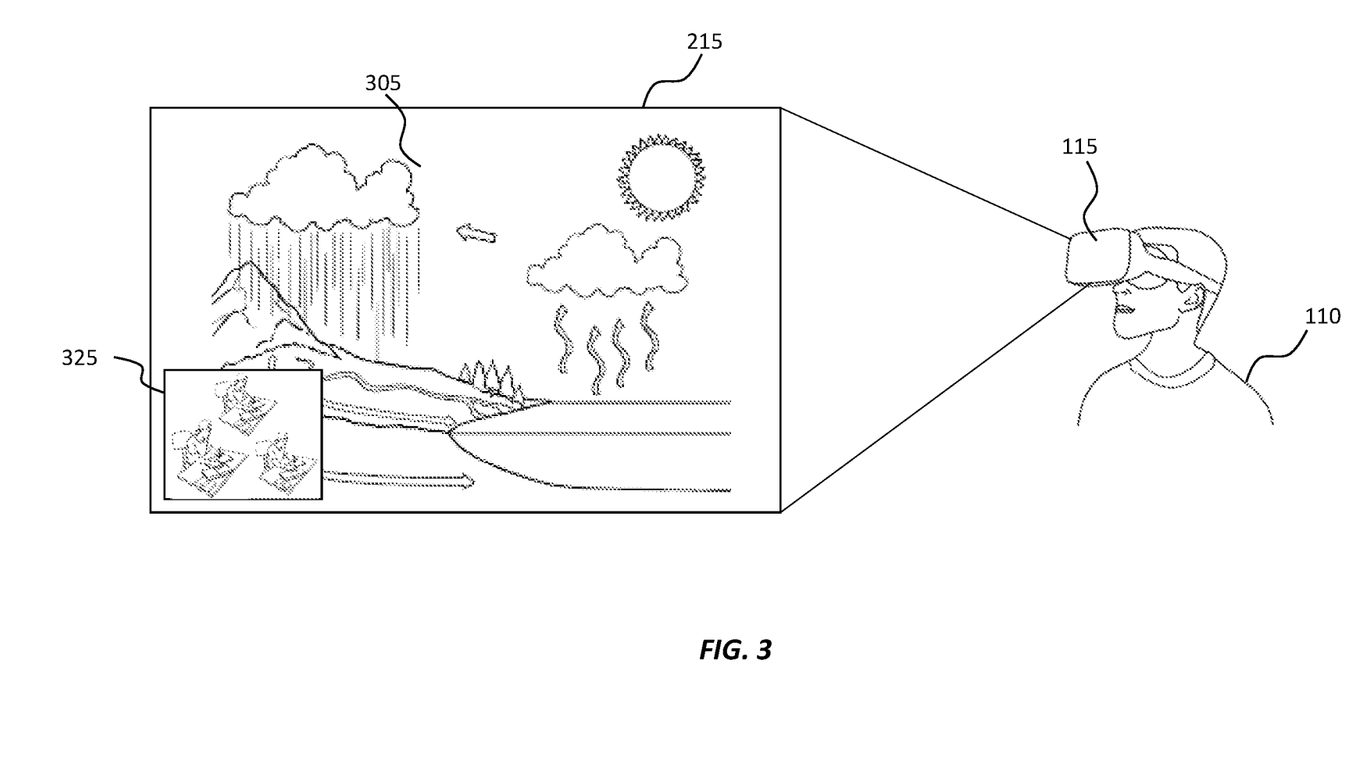
FIG. 3 is an illustration of an extended reality implementation, consistent with embodiments of the present disclosure.

FIG. 3 depicts an alternative embodiment of an extended reality implementation. User 110 may wear and/or operate an extended reality device, such as extended reality device 115. Extended reality device 115 may display extended reality environment 215. As depicted in FIG. 3, user 110 may view a virtual reality space within a first display area 325 of extended reality environment 215. A virtual reality space may comprise an immersive, non-physical space that may provide user 110 with the perception of being present in the virtual reality space. A virtual reality space may be represented (e.g., displayed) in a first display area 305 of the extended reality environment 215. In some embodiments, as depicted in FIG. 3, first display area 305 may represent a majority of the extended reality environment 215, such that user 110 observes an immersive, non-physical virtual reality space within first display area 305. In such an embodiment, extended reality environment 215 may further comprise a second display area 325 that includes a display of the physical environment of user 110. Second display area 325 may comprise a display within extended reality environment 215 of a live view of the physical environment of user 110. For example, user 110 may perceive an immersive virtual reality space within first display area 305 while also perceiving a second display area 325 of the physical environment. User 110 may be able to place second display area 325 in any spatial position in extended reality environment 215. User 110 may be able to interact with virtual reality space through the first display area 305 of extended reality environment 215 while also maintaining a view of the physical environment through second display area 325. In some embodiments, multiple first display areas 305 and/or multiple second display areas 325 may be presented in extended reality environment 215.

Figure 4:
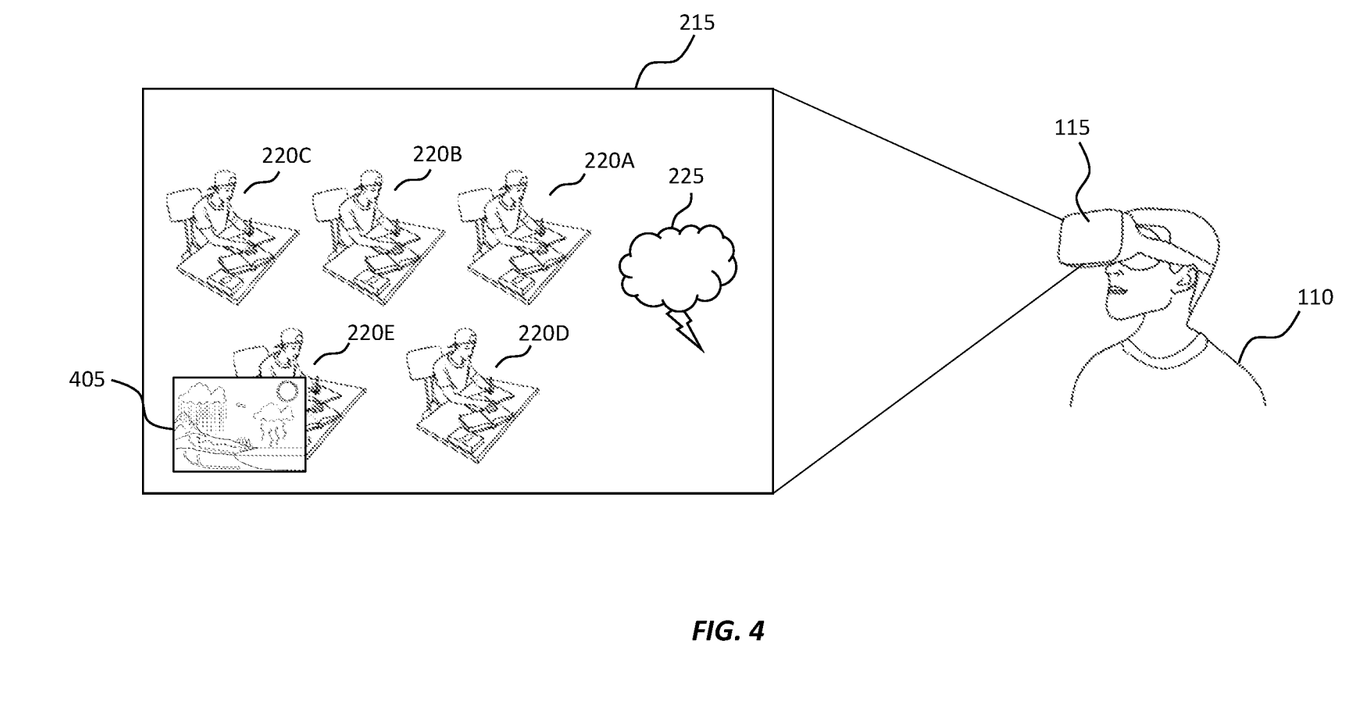
FIG. 4 is an illustration of an extended reality implementation, consistent with embodiments of the present disclosure.

FIG. 4 depicts an alternative embodiment of an extended reality implementation. User 110 may wear or otherwise operate an extended reality device, such as extended reality device 115. Extended reality device 115 may display extended reality environment 215. Extended reality environment 215 may comprise a live direct view of the physical environment of user 110 that may be enhanced with virtual, computer-generated perceptual information. Computer generated perceptual information may include one or more virtual reality objects, such as virtual reality object 225, that user 110 may interact with. For example, as depicted in FIG. 4, user 110 may view the physical environment, including students 220A-220E, and may also view at least one virtual reality object 225 overlaid over the physical environment. In such an embodiment, extended reality environment 215 may further comprise a preview window 405. Preview window 405 may comprise a display of the external view being cast by extended reality device 115. For example, as disclosed herein with respect to FIG. 5, students 220A-220E in the physical environment may observe a different external display in the physical environment than extended reality environment 215 as viewed by user 110 through extended reality device 115. Preview window 405 may allow user 110 to view the external display being cast in the physical environment.

Figure 5:
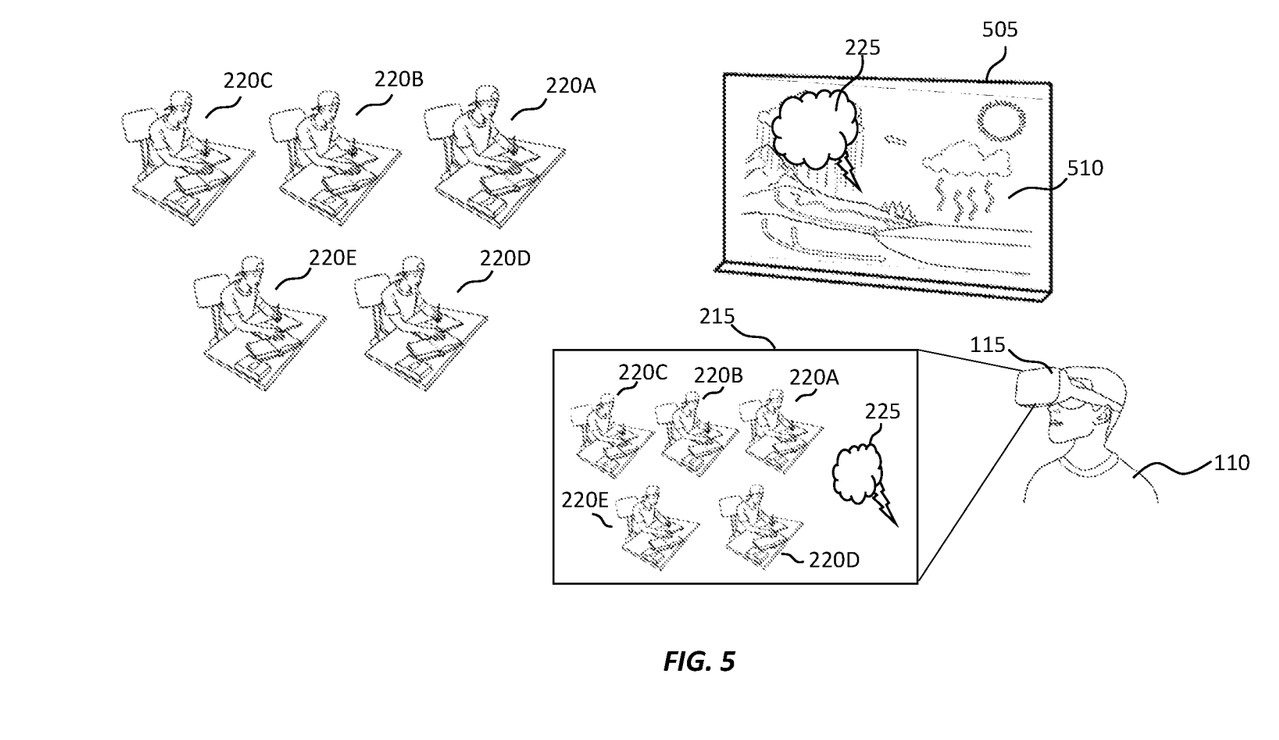
FIG. 5 is an illustration of an extended reality implementation, consistent with embodiments of the present disclosure.

FIG. 5 depicts a view of the physical environment and extended reality environment 215 of an extended reality implementation. In such an implementation, user 110 may wear or otherwise operate extended reality device 115. User 110 may view extended reality environment 215 through extended reality device 115. Extended reality environment 215 may include a live view of the physical environment of user 110, which may include students 220A-220E. Extended reality environment 215 may also include at least one virtual reality object, such as virtual reality object 225. User 110 may interact with virtual reality object 225 in extended reality environment 215 while also simultaneously viewing students 220A-220E in the physical environment. In the physical environment, students 220A-220E may observe an external view 505 of the extended reality environment. External view 505 may be cast to at least one device or otherwise projected onto a screen, wall, board, or other surface (e.g., in the physical environment). External view 505 may comprise a view of virtual reality object 225 overlayed on alternate content 510. As shown in FIG. 5, external view 505 may differ from extended reality environment 215. External view 505 may not display the view of the physical environment that is included in extended reality environment 215 (e.g., an internal view). Instead, external view 505 may display alternate content 510 in addition to virtual reality object 225. By replacing the view of the physical environment shown in extended reality environment 215 with alternate content 510 in the external view 505, user 110 may operate extended reality device 115 while observing students 220A-220E without casting a view of students 220A-220E in the physical environment. Displaying virtual reality object 225 with alternate content 510 in the external view 505 may allow students 220A-220E to engage with the extended reality environment without distraction.

Figure 6:
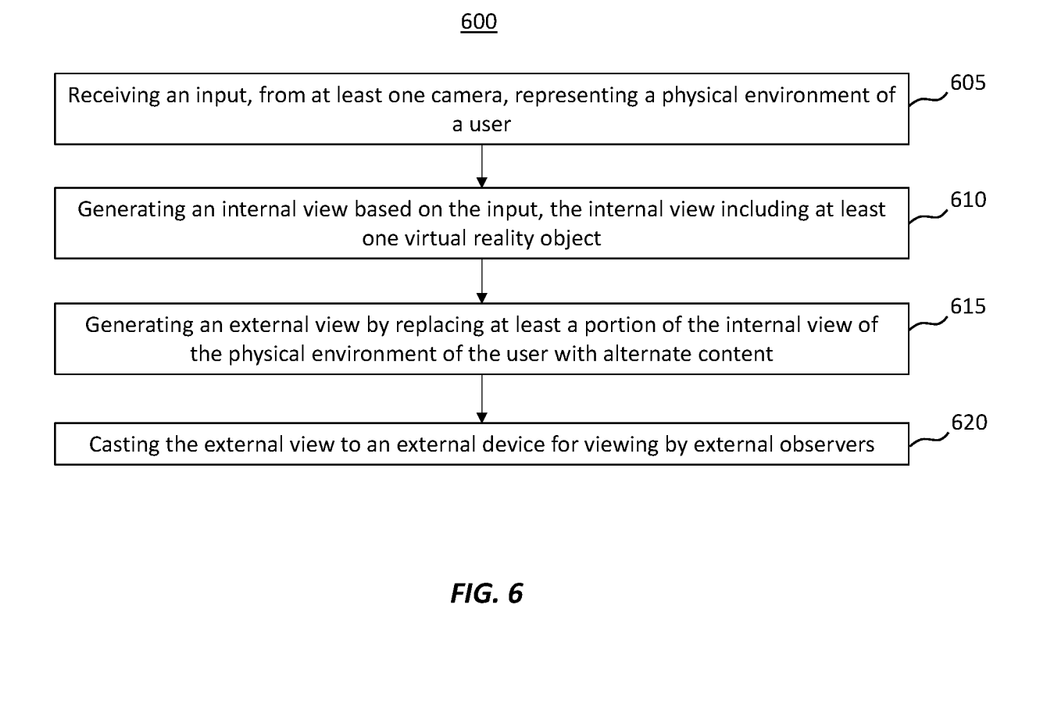
FIG. 6 is a flow diagram of a method for casting an extended reality environment from an extended reality device for external observers, consistent with embodiments of the present disclosure.

FIG. 6 displays a process 600 for casting an extended reality environment from an extended reality device of a user to external viewers. In accordance with disclosed embodiments, process 600 may be implemented in extended reality device 115 depicted in FIG. 1A, or any type of extended reality environment. For example, process 600 may be performed by at least one processor (e.g., processor 155), memory (e.g., memory 150), and/or other components of extended reality device 115, or by any computing device (e.g., a computing device 120 and/or a server 130). In some embodiments, different parts of process 600 may be performed by different devices Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Step 605 of process 600 may include receiving an input from at least one camera of a user, such as user 110. The input may represent a physical environment of a user (e.g., may comprise a view, image, recorded video, or video stream of a physical environment of the user). In some embodiments, the camera of user 110 may include one or more cameras integrated into extended reality device 115. In other embodiments, the camera of user 110 may include one or more cameras located in the physical environment of user 110, such as a camera integrated into a computer, a mobile device (e.g., cell phone), or any other electronic device. The camera may provide an input to extended reality device 115 that may comprise a direct, live-stream view of the physical environment of user 110. Extended reality device 115 may use the input to generate live-stream view or modified version of it using one or more displays of extended reality device 115, such that user 110 may be able to observe the physical environment while wearing or otherwise operating extended reality device 115.

In some embodiments, the input from the camera may be a locked view of the external observers. For example, the one or more cameras on the extended reality device 115 of user 110 or the one or more cameras in the physical environment may be configured to provide a locked view of a certain area of the physical environment of user 110. The locked view of the external observers may provide a stationary view of external observers that will not move or change even if the one or more cameras providing the input to extended reality device 115 are moving (e.g., the extended reality device 115 may dynamically crop a video input from a camera to maintain the locked view). In some embodiments, the locked view may be determined at least in part by a user-configurable boundary, which exist around the external viewers. For example, user 110 may configure a boundary around the external viewers (e.g., by drawing a boundary on a touchscreen interface, by grabbing and/or dragging a virtual boundary to position and/or size the virtual boundary relative to the physical environment, by selecting a position for the virtual boundary relative to the physical environment), such that the input to the extended reality device 115 (e.g., a modified version of the input initially received from a camera) comprises only a portion of the physical environment of user 110. Configuring a boundary around the external viewers in the physical environment may provide a focused view of the physical environment to user 110 through the input from the cameras. In other embodiments, the locked view may be calibrated by user 110. For example, user 110 may calibrate specific camera parameters such as an optical center, focal length, and radial distortion coefficient of the camera lenses, or the orientation and location of the camera. Calibrating may also include defining a particular camera view (e.g., a presenter view, an audience facing-view) and/or associating a particular camera view with an orientation and/or position of the extended reality device 115. Calibrating the locked view may remove distortion caused by the camera and provide a specific view of a portion of the physical environment of user 110. Thereafter, if the cameras providing the input to extended reality device 115 change orientation or position, for example if user 110 moves while using cameras within extended reality device 115, the locked view calibrated by user 110 may stay constant. In yet other embodiments, a locked view of external viewers in the physical environment may be set using face tracking. For example, the cameras providing input to extended reality device 115 may detect and focus on faces in the physical environment. If the camera detects faces, such as those of external observers in the physical environment, camera may focus and lock on those faces (e.g., track the position of the respective faces across images of a video stream). By setting the locked view of the external viewers using face tracking, the camera providing input to extended reality device 115 may provide a constant and stationary view of external observers in the physical environment even if the camera moves relative to the external observers.

Step 610 of process 600 may include generating an internal view based on the input, the internal view including at least one virtual reality object. The input of Step 605 may be used (e.g., modified) to generate an internal view to be displayed by extended reality device 115. In some embodiments, the internal view may be based on the input and/or include at least one virtual reality object. For example, extended reality device 115 may generate at least one virtual reality object and overlay the at least one virtual reality object on at least a portion of the input to generate the internal view (e.g., an augmented reality view).

The internal view may comprise at least one virtual reality object (e.g., generated or rendered by extended reality device 115), such as virtual reality object 225. In some embodiments, the virtual reality object may comprise at least one of a three-dimensional object, a video recording, a white board, or a text display. Additionally or alternatively, the virtual reality object may comprise at least one of inanimate virtual content, animate virtual content configured to change over time or in response to triggers, virtual two-dimensional content, virtual three dimensional content, a virtual overlay over a portion of a physical environment or over a physical object, a virtual addition to a physical environment or to a physical object, a virtual representation of a physical object, a virtual representation of a physical environment, a virtual document, a virtual character or persona, a virtual computer screen, a virtual widget, or any other format for displaying information virtually.

In some embodiments, a view (e.g., generated by the extended reality device 115) may comprise the at least one virtual reality object in a first display area and the internal view of the physical environment of the user (e.g., based on the input from the camera) in a second display area. The first display area may correspond to first display area 305, as disclosed herein with respect to FIG. 3. The second display area may correspond to second display area 325, as disclosed herein with respect to FIG. 3. For example, the first display area may comprise a main display presenting the at least one virtual reality object to the user and the second display area may comprise a preview window displaying the internal view of the physical environment of the user. In some embodiments, the first display area may be cast to an external device for viewing by external observers while the second display area is not cast to the external device for viewing by external observers.

In some embodiments, the input may comprise a preview window of the external view. The preview window of the external view may correspond to preview window 405, as disclosed herein with respect to FIG. 4. For example, the preview window may comprise a display of the external view being cast by the extended reality device, such as extended reality device 115 to the external observers. The preview window may allow user 110 to view the external display being cast in the physical environment, which may differ from the internal view of user 110. In some embodiments, the preview window may not be included in the external view to be cast to an external device for viewing by external observers.

Step 615 of process 600 may include generating an external view by replacing at least a portion of the internal view of the physical environment of the user with alternate content. Generating the external view may comprise removing at least a portion of the internal view of the physical environment of the user and replacing it with alternate content. For example, portions of frames from a video stream may be removed and replaced as the frames are received. In some embodiments, process 600 may include determining the at least one portion of the internal view to remove. For example, process 600 may determine that a locked view, bounded region, and/or region including people or faces (e.g., based on face tracking) should be removed and replaced with alternate content. In some embodiments, the alternate content may comprise a solid background (e.g., a single color, a pattern) behind the at least one virtual reality object. In other embodiments, the alternate content may comprise an image, an animation, a video, or a computer-generated rendering behind the at least one virtual reality object. In some embodiments, the extended reality device may present an interface or other selection mechanism that allows a user to select between a first mode of external view operation and a second mode of external view operation. In the first mode of external view operation, at least a portion of the internal view of the physical environment of the user may be replaced with a solid background. In the second mode of external view operation, at least a portion of the internal view of the physical environment of the user may be replaced with an image, an animation, a video, or computer-generated rendering.

Step 620 of process 600 may include casting the external view to an external device for viewing by external observers. Casting may comprise transmitting (e.g., wirelessly or using a wired connection) or otherwise sharing the external view from the extended reality device to the external device.

Casting may allow the external view to be projected or otherwise shared with external observers on an external device. The external device may comprise a computer, tablet, cell phone, projector, a combination thereof, or any other electronic device capable of projecting or otherwise displaying the external view to external observers. The external view may be cast to the external device through a network, such as network 105.

In some embodiments, process 600 may include displaying the internal view to a display of the extended reality device while casting the external view to the external device. For example, the internal view of the extended reality environment may be displayed simultaneously with casting the external view to the external device. In some embodiments, extended reality device 115 may display the internal view of extended reality environment 215 while also casting the external view to the external device for viewing by the external observers. In some embodiments, extended reality device 115 may detect interactions of user 110 with extended reality environment 215 and may determine changes to the extended reality environment 215 (e.g., as represented in the internal view, the external view, or both), some or all of which extended reality device 115 may simultaneously cast to external observers such that user 110 may present a live display of extended reality environment 215 through the external view to external observers.

In some embodiments, process 600 may further comprise detecting a user interaction associated with at least one private virtual reality object displayed in the internal view (e.g., detecting a grabbing motion within a predetermined distance of the object, detecting a dragging motion within a predetermined distance of the object, detecting a touching or tapping motion within a predetermined distance of the object, detecting a pointing motion within a predetermined distance of and/or angle towards the object, and/or detecting a voice command identifying the object) and hiding the at least one virtual reality object from the external view. In some embodiments, a user, such as user 110 operating extended reality device 115, may observe a variety of virtual reality objects displayed in the internal view of the extended reality environment (e.g., displayed by extended reality device 115). User 110 may want to view one or more of the virtual reality objects in the internal view without displaying those virtual reality objects to external observers in the external view. User 110 may interact with the virtual reality objects through a gesture-based interaction, through a keyboard, a mouse, or any other input/output devices configured to allow user interaction with the extended reality environment. In some embodiments, extended reality device 115 may detect a user designation of at least one of the virtual reality objects displayed in the extended reality environment as private. When generating the external view for casting to the external device, the at least one private virtual reality object may be replaced with alternate content. This may allow user 110 to view the private virtual reality object in the internal view, while preventing the private virtual reality object from being cast to external observers in the external view. In other embodiments, a virtual reality object may already be visible in the external view, and user 110 may want to remove that virtual reality object from the external view. In some embodiments, extended reality device 115 may detect a user interaction selecting at least one virtual reality object for removal from the external view and remove the at least one virtual reality object from the external view. User 110 may designate at least one of the virtual reality objects displayed in the extended reality environment to be removed from the external view. The at least one virtual reality object may be replaced with an alternate content and cast to the external viewers, such that the at least one virtual reality object may no longer be displayed in the external view. The at least one virtual reality object removed from the external view may remain visible in the internal view for user 110.

In some embodiments, a virtual space within an extended reality environment generated by extended reality device 115 (which may be displayed in the internal view) may include a workbench region, which may be designated for private objects. In some embodiments, extended reality device 115 may determine one or more virtual reality objects present in the workbench region (e.g., based on one or more user interactions, based on virtual position data associated with the workbench region and/or objects) and in response may designate those one or more virtual reality objects as private and/or remove them from the external view (e.g., while maintaining them within the internal view).

In some embodiments, a user, such as user 110, may want to display at least one virtual reality object in the external view that is displayed in the internal view but is not displayed in the external view. For example, user 110 may view a variety of virtual reality objects in the internal view of extended reality environment 215. In some embodiments, process 600 may further comprise detecting a user interaction associated with at least one virtual reality object in the external view (e.g., detecting a grabbing motion within a predetermined distance of the object, detecting a dragging motion within a predetermined distance of the object, detecting a touching or tapping motion within a predetermined distance of the object, detecting a pointing motion within a predetermined distance of and/or angle towards the object, and/or detecting a voice command identifying the object) and casting the at least one virtual reality object in the external view. For example, user 110 may interact with at least one virtual reality object (e.g., one of a plurality) in the internal view of extended reality environment 215 by dragging it, which may cause extended reality environment 215 (e.g., after detecting the dragging motion) to render the at least virtual reality object to the external view for casting to the external observers.

In some embodiments, process 600 may further comprise at least one of creating, modifying, or removing additional virtual reality objects within the internal view. A user, such as user 110 operating extended reality device 115, may interact with the extended reality environment presented by extended reality device 115. In interacting with the extended reality environment, user 110 may create, modify, or remove additional virtual reality objects within the internal view presented through extended reality device 115. User 110 may interact with the virtual reality objects through a gesture-based interaction, through a keyboard, a mouse, or any other input/output devices configured to allow user interaction with the extended reality environment. The creation, modification, or removal of the virtual reality objects by user 110 in the internal view may be cast to the external view. In some embodiments, the new, modified, or removed virtual reality objects may be cast to the external view simultaneously with user 110 creating, modifying, or removing the virtual reality objects in the internal view. In other embodiments, user 110 may create or modify the virtual reality objects in the internal view and then designate through an interaction with the extended reality environment that the virtual reality object is to be cast to external viewers through the external view.

It is appreciated that extended reality device 115 or another computing device may perform multiple iterations of process 600, which may overlap with one another, such that certain steps are performed simultaneously or near simultaneously (e.g., simultaneously to a human observer). For example, extended reality device 115 may receive a first input (e.g., step 605) at a first time, and may perform steps 610-620 based on the first input. At a second time, while implementing one or more of steps 610-620 based on the first input, extended reality device 115 may receive a second input (e.g., a repetition of step 605). This may apply to any number of inputs (e.g., separate frames or sequences of frames from a video stream) over any period of time. By repeatedly and/or continually performing process 600 for a certain period of time, extended reality device 115 (or other device implementing process 600) may provide a seamless immersive experience for both a user and an audience, while maintaining the internal and external views separately.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct one or more hardware processors of a computer, other programmable data processing apparatus, or other devices to function in a particular manner, such that the instructions stored in the computer-readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed (e.g., executed) on the computer, other programmable apparatus or other devices to produce a computer implemented process such that the instructions that execute on the computer or other programmable apparatus provide processes for implementing the functions/acts specified in the flowchart or block diagram block or blocks.

Any combination of one or more computer-readable medium(s) may be utilized. The computer-readable medium may be a non-transitory computer-readable storage medium. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber cable, RF, IR, etc., or any suitable combination of the foregoing.

Computer program code for carrying out operations, for example, embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which includes one or more executable instructions for implementing the specified logical function(s). It should also be noted that, In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:
1. A system comprising:
at least one memory storing instructions; and
at least one hardware processor configured to execute the instructions to perform operations for casting an extended reality environment from a wearable extended reality headset device for external observers, the operations comprising:

receiving an input, from at least one camera of the wearable extended reality headset device, the input including a live video stream of a physical environment of a user;

generating an internal view including at least a portion of the live video stream from the at least one camera and at least one virtual reality object;

generating an external view by removing, from the internal view, at least a portion of the live video stream received from the at least one camera and replacing the at least a portion of the live video stream of the physical environment of the user with alternate content as a background for the at least one virtual reality object; and simultaneously displaying the internal view at the wearable extended reality headset device to the user and casting the external view from the wearable extended reality headset device to an external device configured to display the external view for viewing by the external observers.

2. The system of claim 1, wherein the internal view comprises the at least one virtual reality object in a first display area and the input of the physical environment of the user in a second display area.

3. The system of claim 1, wherein the internal view including the at least a portion of the live video stream from the at least one camera and at least one virtual reality object further comprises a preview window of the external view with at least a portion of the live video stream replaced with the alternate content.

4. The system of claim 1, wherein the at least one camera comprises at least one camera of the wearable extended reality headset device of the user or at least one camera within the physical environment.

5. The system of claim 1, the operations further comprising displaying the internal view including the at least a portion of the live video stream from the at least one camera and at least one virtual reality object to a display of the wearable extended reality headset device while casting the external view with at least a portion of the live video stream replaced with alternate content to the external device.

6. The system of claim 1, wherein the alternate content comprises a solid background behind the at least one virtual reality object.

7. The system of claim 1, wherein the alternate content comprises an image, a video, or a computer-generated rendering behind the at least one virtual reality object.

8. The system of claim 1, wherein generating the external view further comprises removing at least one virtual reality object from the external view and replacing the at least one virtual reality object with the alternate content.

9. The system of claim 1, wherein the operations further comprise:
detecting a user designation of the at least one virtual reality object as private;
removing the at least one virtual reality object from the external view; and
replacing the at least one virtual reality object with the alternate content.

10. The system of claim 1, wherein casting the external view to an external device comprises projecting the external view onto at least one of: a screen, a wall, or a board.

11. The system of claim 1, wherein generating the external view further comprises identifying the at least a portion of the live video stream to be removed based on at least one of a locked view, a bounded region, or a region including a view of people.

12. The system of claim 1, wherein casting the external view comprises displaying the external view in the physical environment simultaneously with generating the internal view including the at least a portion of the live video stream from the at least one camera and at least one virtual reality object and generating the external view with at least a portion of the live video stream replaced with the alternate content.

13. The system of claim 1, wherein the internal view further includes a region designated for displaying private virtual reality objects, wherein the region is not displayed in the external view.

14. The system of claim 1, wherein the operations further comprise determining at least one of a locked view, bounded region, or region including people or faces, as the portion of the live video stream of the physical environment to replace with the alternate content.

15. A method for casting an extended reality environment from a wearable extended reality headset device for external observers, the method comprising:
receiving an input, from at least one camera of the wearable extended reality headset device, the input including a live video stream of a physical environment of a user;
generating an internal view including at least a portion of the live video stream from the at least one camera and at least one virtual reality object;
generating an external view by removing, from the internal view, at least a portion of the live video stream received from the at least one camera and replacing the at least a portion of the live video stream of the physical environment of the user with alternate content as a background for the at least one virtual reality object; and
simultaneously displaying the internal view at the wearable extended reality headset device to the user and casting the external view from the wearable extended reality headset device to an external device configured to display the external view for viewing by the external observers.

16. The method of claim 15, wherein the at least one virtual reality object comprises at least one of a three-dimensional object, a video recording, a whiteboard, or a text display.

17. The method of claim 15, further comprising receiving a selection between a first mode of operation and a second mode of operation.

18. The method of claim 17, wherein the first mode of operation comprises replacing at least a portion of the internal view of the physical environment of the user with a solid background and the second mode of operation comprises replacing the view of the physical environment of the user with an image, a video, or a computer-generated rendering.

19. The method of claim 15, further comprising:
detecting a user interaction selecting at least one private virtual reality object in the internal view; and
hiding the at least one private virtual reality object from the external view.

20. The method of claim 15, further comprising:
detecting a user interaction selecting at least one virtual reality object for removal from the external view; and
removing the at least one virtual reality object from the external view.

21. The method of claim 15, wherein the internal view including the at least a portion of the live video stream from the at least one camera and at least one virtual reality object of the physical environment of the user comprises a locked view of the external observers.

22. The method of claim 21, wherein the locked view comprises a user-configurable boundary around the external observers.

23. The method of claim 21, further comprising calibrating the locked view of the external observers.

24. The method of claim 21, further comprising setting the locked view of the external observers using face tracking.

25. A non-transitory computer readable medium including instructions that are executable by one or more processors to perform operations comprising:
receiving an input, from at least one camera of a wearable extended reality headset device, the input including a live video stream of a physical environment of a user;
generating an internal view including at least a portion of the live video stream from the at least one camera and at least one virtual reality object;
generating an external view by removing, from the internal view, at least a portion of the live video stream received from the at least one camera and replacing the at least a portion of the live video stream of the physical environment of the user with alternate content as a background for the at least one virtual reality object; and
simultaneously displaying the internal view at the wearable extended reality headset device to the user and casting the external view from the wearable extended reality headset device to an external device configured to display the external view for viewing by external observers.

26. The non-transitory computer readable medium of claim 25, wherein the operations further comprise at least one of creating, modifying, or removing additional virtual reality objects within the internal view.

27. The non-transitory computer readable medium of claim 26, wherein the operations further comprising casting the additional virtual reality objects through the external view with at least a portion of the live video stream replaced with the alternate content.

\* \* \* \* \*